(12) United States Patent
Reuter et al.

(10) Patent No.: US 11,990,803 B2
(45) Date of Patent: May 21, 2024

(54) COIL WITH A HAIRPIN WINDING AND METHOD FOR PRODUCING SAID COIL

(71) Applicant: ZF FRIEDRICHSHAFEN AG, Friedrichshafen (DE)

(72) Inventors: Stefan Reuter, Hammelburg (DE); Matthias Ebert, Himmelstadt (DE); Ralf Wittstadt, Grettstadt (DE); Christian Brückner, Rimpar (DE); Katja Willacker, Wiesentheid (DE); Roland Lindwurm, Sennfeld (DE); Jochen Wittmann, Burkardroth (DE); Christoph Wieder, Küps (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 270 days.

(21) Appl. No.: 17/640,398

(22) PCT Filed: Aug. 26, 2020

(86) PCT No.: PCT/EP2020/073840
§ 371 (c)(1),
(2) Date: Mar. 4, 2022

(87) PCT Pub. No.: WO2021/043645
PCT Pub. Date: Mar. 11, 2021

(65) Prior Publication Data
US 2022/0385155 A1    Dec. 1, 2022

(30) Foreign Application Priority Data

Sep. 5, 2019   (DE) ..................... 10 2019 213 474.2

(51) Int. Cl.
*H02K 3/04*   (2006.01)
*H02K 15/06*   (2006.01)

(52) U.S. Cl.
CPC ............. *H02K 15/064* (2013.01); *H02K 3/04* (2013.01)

(58) Field of Classification Search
CPC .......... H02K 3/04; H02K 3/28; H02K 15/064; H02K 15/0087; H02K 3/50; H02K 3/38; H02K 1/16; H02K 15/024; H02K 3/14
See application file for complete search history.

(56) References Cited

U.S. PATENT DOCUMENTS

2003/0127935 A1*   7/2003   Mori ................... H02K 15/0081
                                                        310/206
2004/0007931 A1    1/2004   Gorohata et al.
(Continued)

FOREIGN PATENT DOCUMENTS

DE    69704773    2/2002
DE    10260314    9/2004
(Continued)

OTHER PUBLICATIONS

Office Action of corresponding German Patent Application No. 10 2019 213 474.2.

*Primary Examiner* — Leda T Pham
(74) *Attorney, Agent, or Firm* — Cozen O'Connor

(57) ABSTRACT

A coil with a distributed winding formed from hairpins that each have two straight-line conductor portions arranged in different slots of a coil body. Contact regions shaped in circumferential direction adjoin the conductor portions at one axial end and are connected at the other axial end through a turning region. The contact regions have at the end remote of the coil body a connection portion that are aligned in radially extending rows. The contact regions of a layer are shaped in the same circumferential direction. A portion of the contact regions of an outer layer is deformed in radial direction to form an additional, and these contact regions are (Continued)

shaped in a circumferential direction opposite to the contact regions of the outer layer.

10 Claims, 3 Drawing Sheets

(56) References Cited

U.S. PATENT DOCUMENTS

| | | |
|---|---|---|
| 2009/0001841 A1 | 1/2009 | Naganawa et al. |
| 2010/0289374 A1 | 11/2010 | Koga et al. |
| 2012/0007460 A1* | 1/2012 | Kitamura ................. H02K 3/12 |
| | | 310/195 |
| 2020/0169137 A1* | 5/2020 | Tang ...................... H02K 7/006 |
| 2020/0235622 A1* | 7/2020 | Tian ........................ H02K 3/12 |

FOREIGN PATENT DOCUMENTS

| | | |
|---|---|---|
| DE | 112014003897 | 6/2016 |
| DE | 102017201533 | 8/2018 |
| WO | WO 2019062896 | 4/2019 |
| WO | WO 2019062905 | 4/2019 |
| WO | WO 2019062908 | 4/2019 |

* cited by examiner

COIL WITH A HAIRPIN WINDING AND METHOD FOR PRODUCING SAID COIL

CROSS REFERENCE TO RELATED APPLICATIONS

This is a U.S. national stage of Application No. PCT/EP2020/073840 filed Aug. 26, 2020. Priority is claimed on German Application No. DE 10 2019 213 474.2 filed Sep. 5, 2019 the content of which is incorporated herein by reference.

BACKGROUND OF THE INVENTION

1. Field of the Invention

The disclosure is directed to a configuration of a hairpin winding on a side of contact regions of the hairpins, which contact regions are to be connected.

2. Description of Related Art

It is known from the prior art to use pre-shaped hairpins. However, the assembly is very complicated. Alternatively, it is known to employ U-shaped hairpins and to shape them subsequently. A hairpin winding is known, for example, from DE 10 2017 201 533 A1. Additional jumpers are required in order to connect individual endpoints of partial coils so that partial strands of the windings are produced. As a result of these jumpers, the quantity of component parts is increased and a higher manufacturing expenditure is required for positioning these jumpers and electrically conductively connecting them to the corresponding contact ends.

SUMMARY OF THE INVENTION

It is the object of one aspect of the invention to provide a coil with hairpin winding in which the partial strands are simply and quickly producible and a method therefor.

A coil with a distributed winding is formed from a plurality of hairpins, the hairpins having, in each instance, two straight-line conductor portions arranged in different slots of a coil body, and contact regions which are shaped in circumferential direction adjoin the conductor portions at one axial end, and the conductor portions are connected at the other axial end through a turning region, an even-number quantity of conductor portions being provided in each instance in the slots of the coil body in layers in radial direction, the contact regions having at the end thereof remote of the coil body a connection portion, and the connection portions are aligned in radially extending rows, the contact regions of a layer being shaped in the same circumferential direction, characterized in that a portion of the contact regions of an outer layer is deformed in radial direction in order to form an additional layer, and these contact regions are shaped in a circumferential direction opposite to the contact regions of the outer layer.

Reference is made to DE 10 2017 201 533 A1 for a basic construction of a hairpin winding, paragraphs [0005 to 0012] of which are hereby incorporated by reference in the description.

To connect contact regions of different partial coils to one another, a portion of the contact regions of an outer layer, particularly contact regions constituting an end of a partial coil, is radially deformed so as to produce an additional layer. Accordingly, with regard to the layers, a coil according to one aspect of the invention has more layers than there are conductor portions in the slots. The outer layer can be a radially outer layer or a radially inner layer. Accordingly, the additional layer is located radially inwardly of or radially outwardly of the further layers. The additional layer and the directly adjacent outer layer have correspondingly fewer contact regions.

The contact regions of the additional layer are shaped in opposite circumferential direction relative to the directly adjacent outer layer. In this way, contact regions which were originally arranged in the same layer can be directly connected to one another subsequently.

The shaping in circumferential direction in the additional layer can be identical or different with respect to the directly adjacent outer layer in terms of amount. In this way, the winding pitch between the contact regions to be connected can be adapted according to requirements.

Embodiment forms of a coil are characterized in that a portion of the contact regions is deformed in radial direction in both outer layers and forms an additional layer. Accordingly, embodiment forms in which an additional layer is formed both radially inside and radially outside are also possible. Constructions of this kind have advantages particularly with coils which have a plurality of coaxial hairpin windings and/or contact regions for connecting to an interconnect or to power electronics in middle layers.

Coils according to one aspect of the invention are characterized in that a portion of the rows has an odd-number quantity of layers due to the contact regions in the additional layer, and in that the contact regions in these rows are provided for connecting to an interconnect, and the further contact regions are electrically conductively connected by the connection portions thereof to form contact pairs. Depending on the winding pitch, the shaping and the position of the contact regions at the circumference, the connection portions of the contact regions in the additional layer are advantageously arranged in rows in which there is also arranged a contact region for connecting to an interconnect or power electronics. In this way, contact regions are sufficiently provided again in the row in order to connect all of the contact regions, except for the contact region to be connected to the interconnect, by their connection portions to form contact pairs.

Correspondingly, gaps are present in the outer layer at the positions of the contact region brought into the additional layer, for which reason an odd-number quantity of contact regions is likewise provided in these rows after shaping. Contact regions for connecting to an interconnect or power electronics are also preferably located in these rows.

The contact pairs of these rows which have an odd-number quantity of contact regions and are produced in addition to the contact regions provided for connecting to the interconnect preferably serve as transitions to connect between the individual partial strands of adjacent double layer or to connect in the additional layer to a partial strand of the same double layer.

In embodiments with an additional layer at the two radially outer layers, for example, a plurality of coaxial hairpin windings, the odd-number quantity refers to one of the individual hairpin windings, respectively.

According to one aspect of the invention, a coil is characterized in that the hairpin winding comprises a plurality of partial strands such as different phases and/or parallel strands, and in that, for each partial strand, a contact region is arranged in the additional layer. By "partial strand" is meant a subregion that corresponds to a distributed winding formed by conductor portions connected via turning regions and contact pairs and is situated between the contact regions for connecting to power electronics and runs through the layers in radial direction twice, once from the inside to the outside and once from the outside to the inside. If the distributed winding runs through the layers more than twice, for example, when the contact regions for connecting to power electronics lie on different layers or the distributed winding runs through the layers multiple times in both radial directions, this is viewed correspondingly as a plurality of partial strands. In order to connect these partial strands, more accurately the conductor portions thereof in the outer layer or double layer, during the reversal of the traversing direction in radial direction, a contact region is brought into the additional layer for every partial strand. Accordingly, the connection portion of the contact region in the additional layer can be electrically conductively connected to a connection portion of a contact region in the outer layer to form a contact pair.

According to one aspect of the invention a coil is characterized in that the contact regions of the additional layer are shaped by the same pitch as the further contact regions. Accordingly, a consistent pitch of the winding can be retained.

According to one aspect of the invention a coil is characterized in that the contact regions of the additional layer are shaped by a different pitch than the further contact regions. In this way, depending on the construction of the hairpin winding, for example, alternation of slots of a pole and/or chords are producible in a simple manner.

A further aspect of the disclosure is an electric machine characterized in that a coil is provided according to one aspect of the invention.

Another aspect of the disclosure is a method for producing a coil according to the invention, comprising the following:
 a) inserting the hairpins into the coil body such that the contact regions are flush with the conductor portions;
 b) shaping a portion of the contact regions of an outer layer in radial direction so as to arrange them in an additional layer;
 c) shaping the contact regions of the layers in circumferential direction, the connection regions being arranged in radially extending rows.

Before inserting into the slots of the coil body, the hairpins are advantageously formed as two conductor portions extending in parallel which are connected to one another via a turning region, and a contact region adjoins the conductor portions in a flush manner in each instance. The designation "hairpin" also derives from this basic shape. The aligning contact regions have the advantage that the hairpins can be inserted simply and compactly into the slots. After the hairpins have been inserted into the coil body, a portion of the contact regions of an outer layer are shaped in radial direction away from the further layers so as to bring them into an additional layer.

The contact regions projecting axially from the coil body are shaped in different circumferential directions so that the connection portions of contact regions of adjacent layers are aligned with respect to one another.

Embodiment forms of a method are characterized in that b) and c) are carried out simultaneously. In addition to a sequential flow of the method, it is also possible to carry out the shaping simultaneously, at least on the outer layer and the additional layer. By an appropriate construction of a twisting tool for producing the shaping in circumferential direction, a portion of the contact region of the outer layer can be deflected in radial direction instead of a circumferential direction by the tool portion and can be received by another portion of the tool. The other portion of the tool preferably executes a movement in circumferential direction opposite the tool part for the outer layer in order to shape the contact regions of the additional layer in circumferential direction.

Methods according to aspects of the invention are carried out in that connection portions of adjacent contact regions are welded into a row to form contact pairs in a following d). The shaped contact regions projecting from the coil body at one axial side are aligned relative to one another such that the connection portions of contact regions of adjacent layers can be electrically conductively connected such that they form contact pairs insofar as they are not provided for connecting to an interconnect or power electronics.

In addition to the aspects of the method, the further description also applies analogously to the coil and electric machine.

BRIEF DESCRIPTION OF THE DRAWINGS

The invention will be explained in more detail in the following with reference to the figures. Like or similar component parts are designated with consistent reference numerals. In particular, the figures show.

DETAILED DESCRIPTION OF THE PRESENTLY PREFERRED EMBODIMENTS

Figure 1:
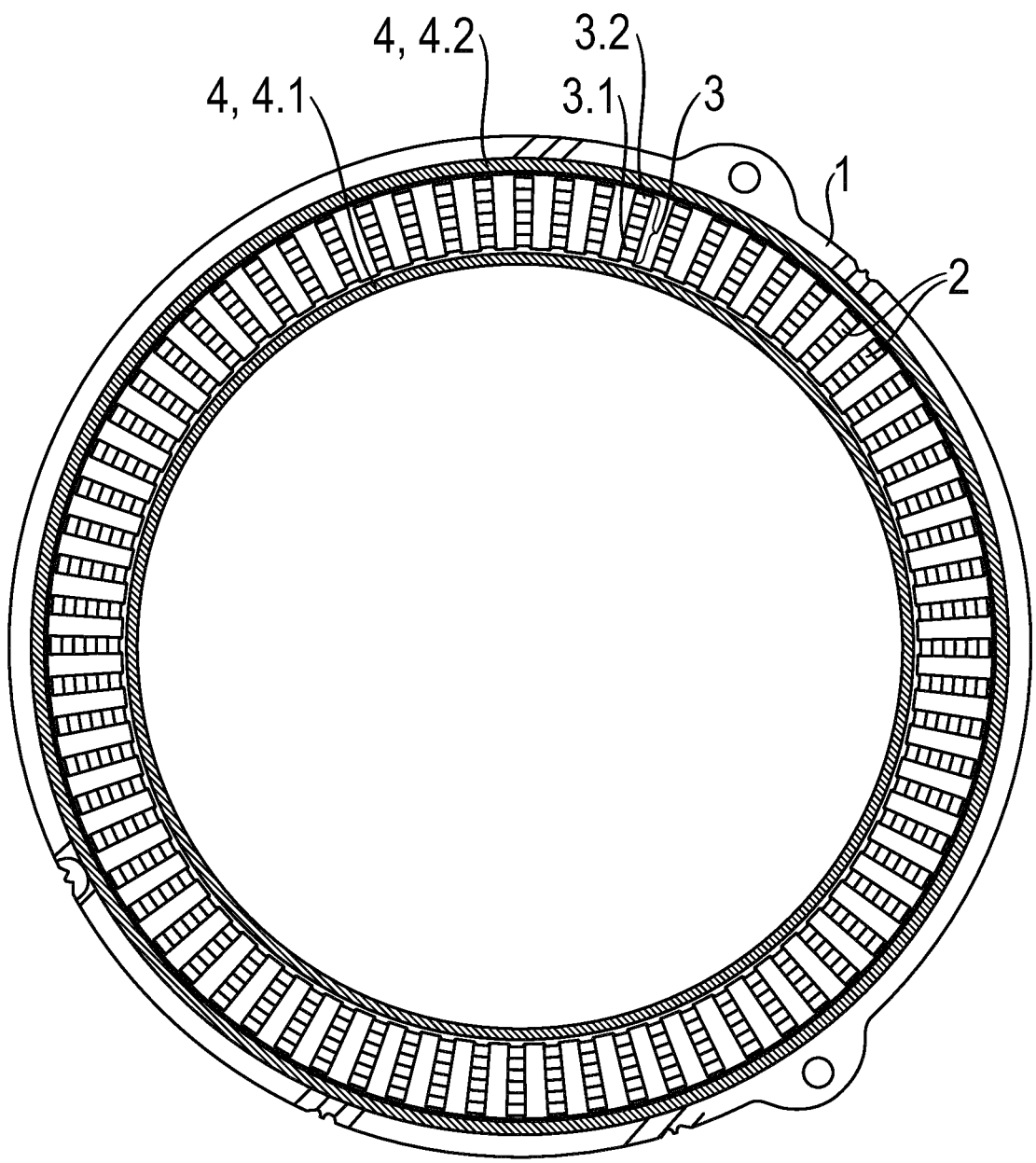
FIG. 1 is a schematic view from axial direction.

FIG. 1 schematically shows an embodiment example of a coil from axial direction. The coil has a coil body 1 preferably formed from layered plates. A plurality of axially extending slots is provided in the coil body 1, the conductor portions of the hairpins 2 being arranged therein in a plurality of radially stacked layers 3; 3.1; 3.2. In the depicted example, six layers 3; 3.1; 3.2 of hairpins 2 are provided, and another even-number quantity of layers 3; 3.1, 3.2 is also possible. An even-number quantity of layers 3; 3.1; 3.2 is always provided because, generally, hairpins 2 are electrically conductively connected to one another inside of a double layer. If the partial coil formed from hairpins 2 which are connected to one another runs through a plurality of double layers, the latter have transfer contacts with respect to one another.

The partial coils often run through the layers 3; 3.1; 3.2 multiple times in radial direction, for example, from an outer layer 3.1; 3.2 to the other outer layer 3.1; 3.2 and back. In these cases, the hairpins 2 of the oppositely running strands must be connected in the outer double layer.

For this purpose, according to one aspect of the invention, an outer layer 3.1; 3.2 corresponding to the portion of contact regions 2.1 of hairpins 2 is brought into an additional layer 4; 4.1; 4.2. In FIG. 1, the position of a possible additional layer 4; 4.1; 4.2 is shown by hatched annular areas. A radially inner additional layer 4.1 would correspondingly receive a portion of the contact region 2.1 originally in the radially inner outer layer 3.1, or contact regions 2.1 of a radially outer layer 3.2 would be received in a radially outer additional layer 4.2.

After a shaping in circumferential direction, the contact regions 2.1 in the additional layer 4; 4.1; 4.2 are electrically conductively connected to contact regions of the hairpins 2 of the corresponding outer layer 3.1; 3.2, which contact regions are likewise shaped in circumferential direction.

Figure 2:
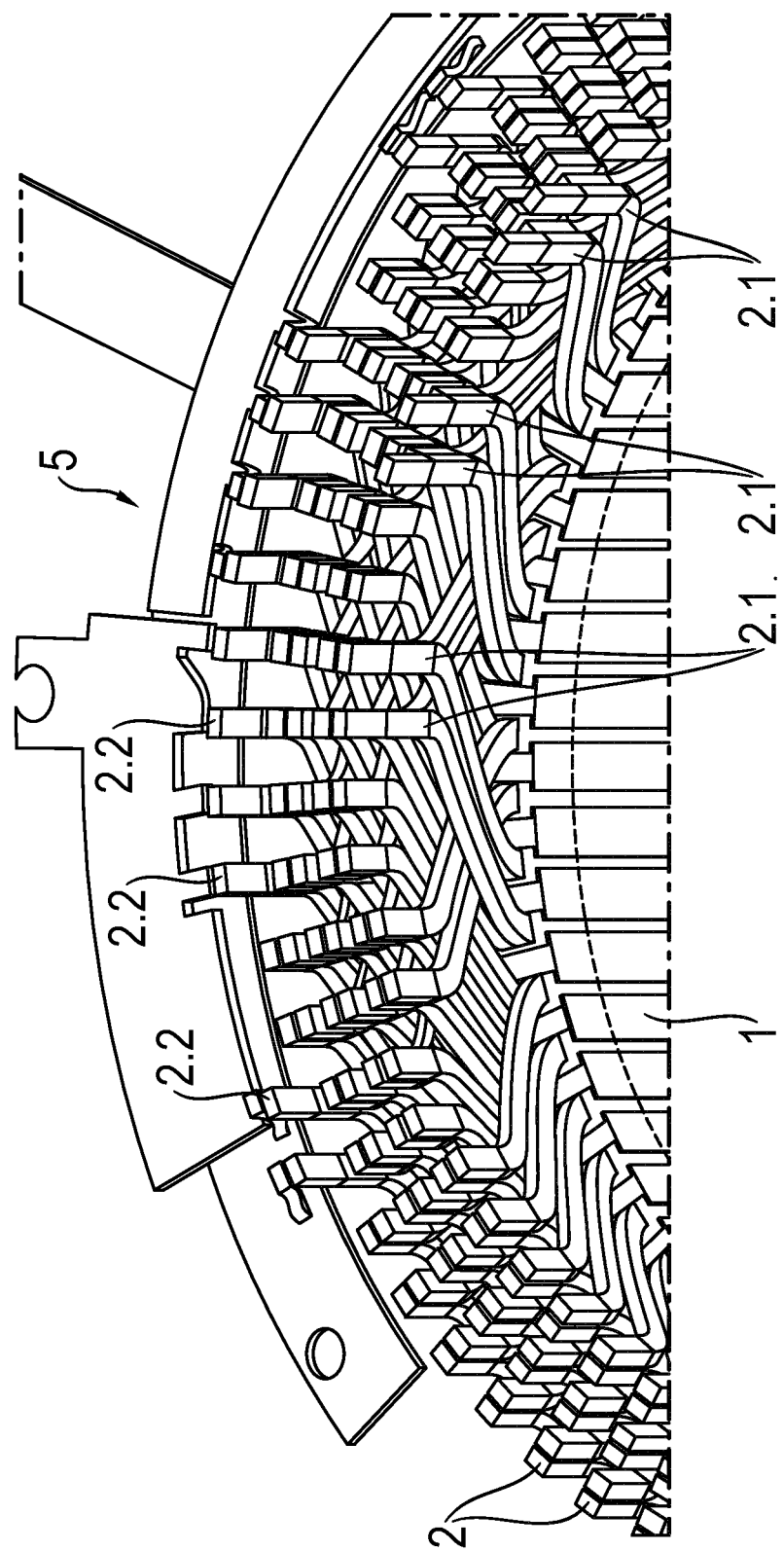
FIG. 2 is a partial portion.

FIG. 2 shows a perspective view of a subregion of a coil in an embodiment example. In this instance, six layers 3; 3.1; 3.2 of hairpins 2 are likewise provided in the slots of the coil body 1.

An additional layer 4.1 is provided adjacent to the radially inner layer 3.1. A portion of the contact regions 2.1 is shaped from the outer layer 3.1 into the additional layer 4.1.

Like the contact regions of the other layers 3; 3.1; 3.2, the contact regions 2.1 in the additional layer 4.1 are shaped in circumferential direction so as to be put together with other contact regions to form contact pairs. The direction of the shaping in circumferential direction is opposed to the direction of the outer layer 3.1 so that a winding pitch is achieved.

Because of the contact regions 2.1 shaped in the additional layer 4.1 and the oppositely running interleaving through the shaping in circumferential direction, radial rows of shaped contact regions result with a quantity of contact regions diverging from the quantity of layers. In the depicted embodiment example, there are rows with five and six contact regions in addition to the radial rows with the six contact regions that correspond to the quantity of layers and which are connected, respectively, to form three contact pairs. In these rows with an odd-number quantity, the contact regions 2.2 are provided for connecting to an interconnect 5 in addition to the contact pairs. The contact regions 2.2 of the partial coils are possibly connected to one another and to power electronics via the interconnect 5.

Figure 3:
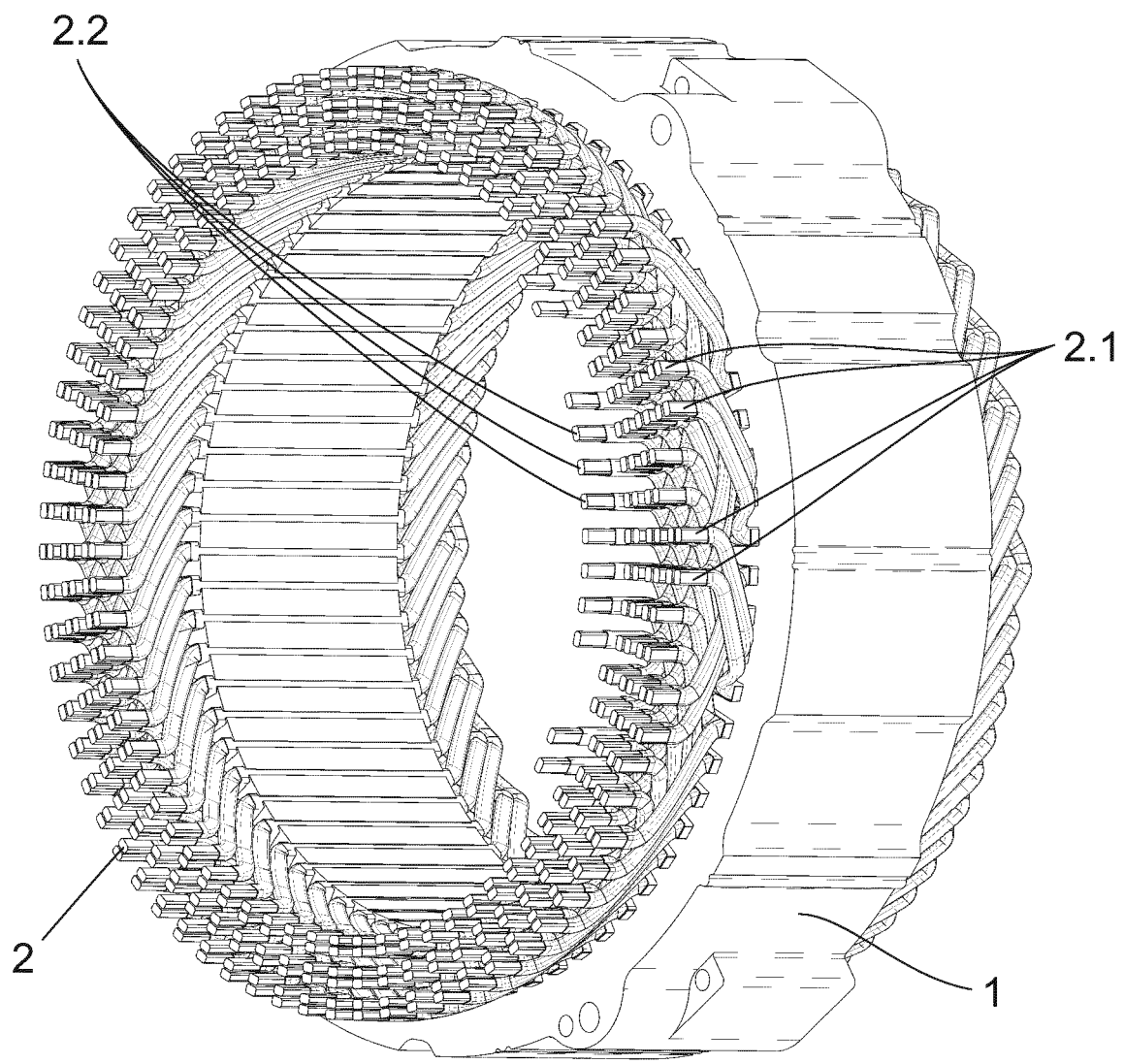
FIG. 3 a perspective view.

In the embodiment example shown in FIG. 3, the additional layer 4.2 is arranged adjacent to the radially outer layer 3.2. Accordingly, the contact regions 2.1 shaped in the additional layer 4.2 run along an outer circumferential area. In this embodiment example, the contact regions 2.2 are provided for connecting to an interconnect 5, not shown in FIG. 3, at the radially inner layer 3.1.

Further, the embodiment example shown in FIG. 3 is substantially analogous to that shown in FIG. 2, and reference is therefore made to the foregoing description.

Depending on the existing space, the construction and coil design, the additional layer 4.1; 4.2 can possibly also be provided on both radial sides, contrary to the depicted embodiment examples, as is indicated, for example, in FIG. 1.

The invention is not limited to the described embodiments. As was stated above, only individual advantageous features can also be provided or various features of different examples can be combined.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A coil comprising:
 a coil body;
 a distributed winding formed from a plurality of hairpins, wherein each hairpin comprises:
  two straight-line conductor portions arranged in respective slots of the coil body;
  contact regions shaped in circumferential direction adjoin the conductor portions at one axial end;
  a turning region at an other axial end by which the conductor portions are connected; and
  a respective connection portion at an end of each contact region, wherein the connection portions are aligned in radially extending rows,
 wherein an even-number quantity of conductor portions is provided in each instance in the slots of the coil body in layers in radial direction,
 wherein the contact regions of a layer are shaped in a same circumferential direction,
 wherein a portion of the contact regions of an outer layer, the outer layer being at least one of an a radially inner layer and a radially outer layer, is deformed in radial direction to form an additional layer,
 wherein the contact regions are arranged in more layers than conductor sections in the slots, and these contact regions are shaped in a circumferential direction opposite the contact regions of the outer layer,
 wherein the contact regions of the additional layer are arranged in a same row with contact areas of the outer layer for direct connection thereto.

2. The coil according to claim 1, wherein a portion of the contact regions is deformed in radial direction at both the radially inner and radially outer layers and forms a further additional layer.

3. The coil according to claim 2, wherein the contact regions of the additional layer are shaped with a same pitch as the further contact regions.

4. The coil according to claim 2, wherein the contact regions of the additional layer are shaped by a different pitch than the further contact regions.

5. The coil according to claim 1, wherein a portion of the rows has an odd-number quantity of layers due to the contact regions in the additional layer, and in that the contact regions in these rows are provided for connecting to an interconnect, and contact ends are electrically conductively connected by the connection portions thereof to form contact pairs.

6. The coil according to claim 1, wherein the coil comprises a plurality of partial strands such as different phases and/or parallel strands, and for each partial strand, a contact region is arranged in the additional layer.

7. An electric machine, comprising:
 a coil comprising:
  a coil body;
  a distributed winding formed from a plurality of hairpins, wherein each hairpin comprises:
   two straight-line conductor portions arranged in different slots of the coil body;
   contact regions shaped in circumferential direction adjoin the conductor portions at one axial end;
   a turning region at an other axial end by which the conductor portions are connected; and
   a respective connection portion at an end of each contact region, wherein the connection portions are aligned in radially extending rows,
  wherein an even-number quantity of conductor portions is provided in each instance in the slots of the coil body in layers in radial direction,
  wherein the contact regions of a layer are shaped in a same circumferential direction, wherein a portion of the contact regions of an outer layer, the outer layer being at least one of an a radially inner layer and a radially outer layer, is deformed in radial direction to form an additional layer, wherein the contact regions are arranged in more layers than conductor sections in the slots, and these contact regions are shaped in a circumferential direction opposite the contact regions of the outer layer, wherein the contact regions of the additional layer are arranged in a same row with contact areas of the outer layer for direct connection thereto.

8. A method for producing a coil, comprising:
a) inserting hairpins into a coil body, wherein contact regions of the hairpins are flush with conductor portions of the hairpins;
b) shaping a portion of the contact regions of an outer layer, the outer layer being at least one of an a radially inner layer and a radially outer layer, in radial direction to arrange them in an additional layer; and
c) shaping the contact regions of the radially inner and a radially outer layers in circumferential direction, wherein the connection regions are arranged in radially extending rows, wherein the contact regions are arranged in more layers than conductor sections in the slots, and these contact regions are shaped in a circumferential direction opposite the contact regions of the outer layer, wherein the contact regions of the additional layer are arranged in a same row with contact areas of the outer layer for direct connection thereto.

9. The method according to claim 8, wherein b) and c) are carried out simultaneously.

10. The method according to claim 8, wherein connection portions of adjacent contact regions are welded in a row to form contact pairs.

* * * * *